United States Patent [19]

Warnstam et al.

[11] 4,272,783
[45] Jun. 9, 1981

[54] CORRELATION FOLLOWER FOR TRACKING AN OBJECT

[75] Inventors: Lars-Ake Warnstam; Rune Jonsson; Georg Ludvigsson, Linköping, all of Sweden

[73] Assignee: Saab-Scania AB, Linköping, Sweden

[21] Appl. No.: 127,211

[22] PCT Filed: Jun. 29, 1979

[86] PCT No.: PCT/SE78/00067

§ 371 Date: Jul. 2, 1979

§ 102(e) Date: Jun. 29, 1979

[87] PCT Pub. No.: WO79/00260

PCT Pub. Date: May 17, 1979

[30] Foreign Application Priority Data

Nov. 2, 1977 [SE] Sweden .............................. 7712352

[51] Int. Cl.³ .............................................. H04N 7/18
[52] U.S. Cl. .............................. 358/126; 250/203 CT; 364/516
[58] Field of Search ............... 358/125, 126; 364/516; 250/203 CT

[56] References Cited

U.S. PATENT DOCUMENTS

| | | | |
|---|---|---|---|
| 3,416,752 | 12/1968 | Hembree | 244/3.17 |
| 3,828,122 | 8/1974 | McPhee | 358/126 |
| 3,955,046 | 5/1976 | Ingham | 358/126 |
| 4,133,004 | 1/1979 | Fitts | 358/126 |

*Primary Examiner*—Howard W. Britton
*Attorney, Agent, or Firm*—James E. Nilles; James R. Custin

[57] ABSTRACT

A correlation follower comprising an image sensor (1) adjustable sideways and in height with a limited field of view, which is cyclically scanned by the sensor the output signal of which reflects the image content within the field of view and a video correlator (3) for controlling the alignment of the sensor in dependance of the output signal of the image sensor.

The video correlator (3) has two addressable memories (12, 14) the one of which is a real time memory (12), i.e. in this memory a section of the field of view is stored for each cycle. The other memory is a reference image memory (14) and is updated with the content of the real time memory (12). During the correlation the contents of the memories are displaced in relation to each other and an error signal, corresponding to the position of displacement for which maximum correlation is achieved, is made to control, through said control circuits, the alignment of the sensor.

To make the tracking process insensitive to disturbancies and image elements which appear momentarily in the field of view, for each scanning cycle only a part of the positions of the reference image memory (14) are updated by selecting the addresses to said positions randomly or according to a predetermined rule of selection. By that the positions which are updated during one cycle in positions that are distributed over the entire area of the memory.

5 Claims, 3 Drawing Figures

4,272,783

CORRELATION FOLLOWER FOR TRACKING AN OBJECT

TECHNICAL FIELD

The present inventon relates to a correlation follower for tracking an object, comprising an image sensor having a limited field of view and arranged to scan said field of view cyclically and to supply, in preselected form, a video signal representing the field of view in digital form for each scanning cycle, a video correlator with two addressable memories, one of which has the object of storing one section of the field of view, while the other memory is arranged to be updated with the content of the first memory, said video correlator being arranged to produce, once the image sensor has been so aligned that an object is encompassed within the section, an error signal controlling the alignment of the image sensor with the object, said error signal corresponding to a displacement of the section in the first memory relative to the section in the other memory, for which displacement a maximum correlation is achieved between the contents of the memories.

BACKGROUND ART

By correlation one can get, according to a predetermined rule of evaluation, a measure of how well the contents of the memories coincide at different relative displacements.

Essential for the correlation and hence also for the tracking process is the way in which the other memory, hereinafter referred to as the reference image memory, is updated. In known correlation followers, see e.g. U.S. Pat. No. 3,828,122, updating is brought about in the course of one single scanning cycle, the updating process being repeated either periodically after a certain number of cycles, or when the maximum correlation drops below a preselected value. If an image element irrelevant to the tracking process appears momentarily in the section, the first of these updating alternatives entails the danger of the reference image memory being updated precisely when the image element appears, which may jeopardise the tracking process. With the other updating alternative the appearance of the image element may trigger updating of the reference image memory. This leads in practice to tracking of the irrelevant image element.

The object of the present invention is to bring about such updating of the reference image memory that the above disadvantages are avoided and this is enabled in that the video correlator has means arranged to select at each scanning cycle addresses of positions in the reference image memory for the purpose of updating said memory randomly or according to a predetermined rule of selection so that said memory at each scanning cycle is updated only partly and in positions that are distributed over the area of the memory.

DESCRIPTION OF THE DRAWING

The invention is further explained below with reference to the attached drawing in which.

DESCRIPTION OF A PREFERRED EMBODIMENT

Figure 1:
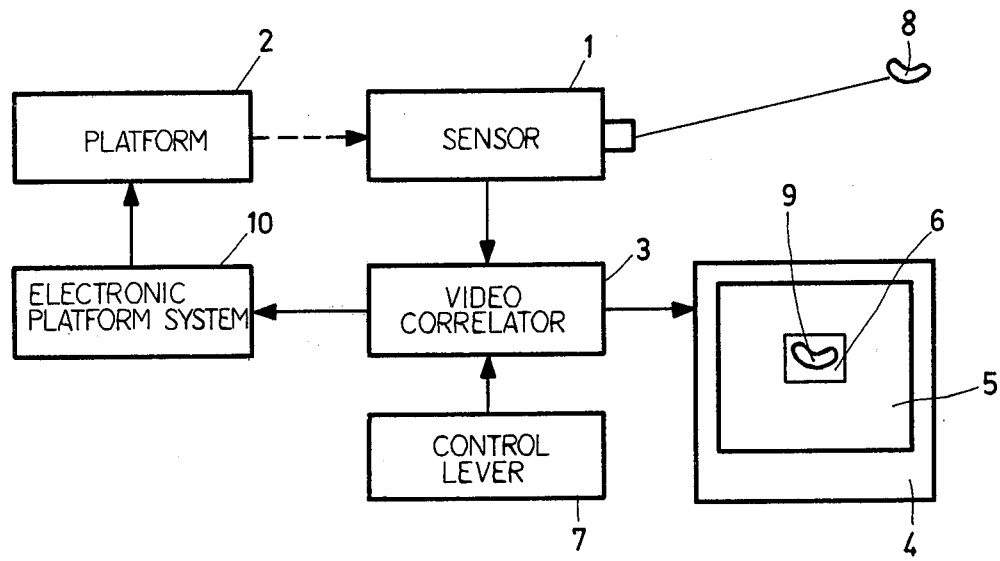
FIG. 1 is a block diagram showing schematically the design of a correlation follower.

In FIG. 1 an image sensor of known type and consisting of a TV or IR camera with a field of view restricted in space is designated 1. The sensor is mounted on a platform 2 capable of being adjusted both sideways and in height and is so designed as to scan the field of view cyclically and to supply a video signal which reflects the image content within the field of view in electric form. The video signal is supplied, via a video correlator 3 connected with the sensor 1, to a monitor 4 on screen 5 on which the sensor's field of view is displayed. Superimposed over the video signal in the video correlator 3 is a cursor, the position of which on the monitor screen 5 is shown as a window 6 which an operator can move, with the aid of a control lever 7, to any position on the screen. Also the size of window 6 can be varied with the aid of control lever 7, and the said size is so selected that the image 9 of an object 8 on screen 5 fits exactly within the window. In this way the effect of interference from the surroundings of the object can be minimised, i.e. irrelevant background contrasts are screened off. Using control lever 7 the operator can also align the sensor 1 with object 8 and get the correlation follower to lock on the latter. In this process, aligning signals from control lever 7 are transmitted via the video correlator 3 to an electronic platform system 10 in which the aligning signals are converted into control signals for aligning the platform 2 and hence the sensor 1 both laterally and in height. After locking on, the sensor 1 tracks the movements of the object 8, and as it does so an error signal is extracted from the video signal of sensor 1 by means of a correlation process, which will be discussed in connection with FIG. 2, the said error signal being converted in the electronic platform system 10 into control signals for aligning the sensor 1 as described above in connection with control lever 7.

Figure 2:
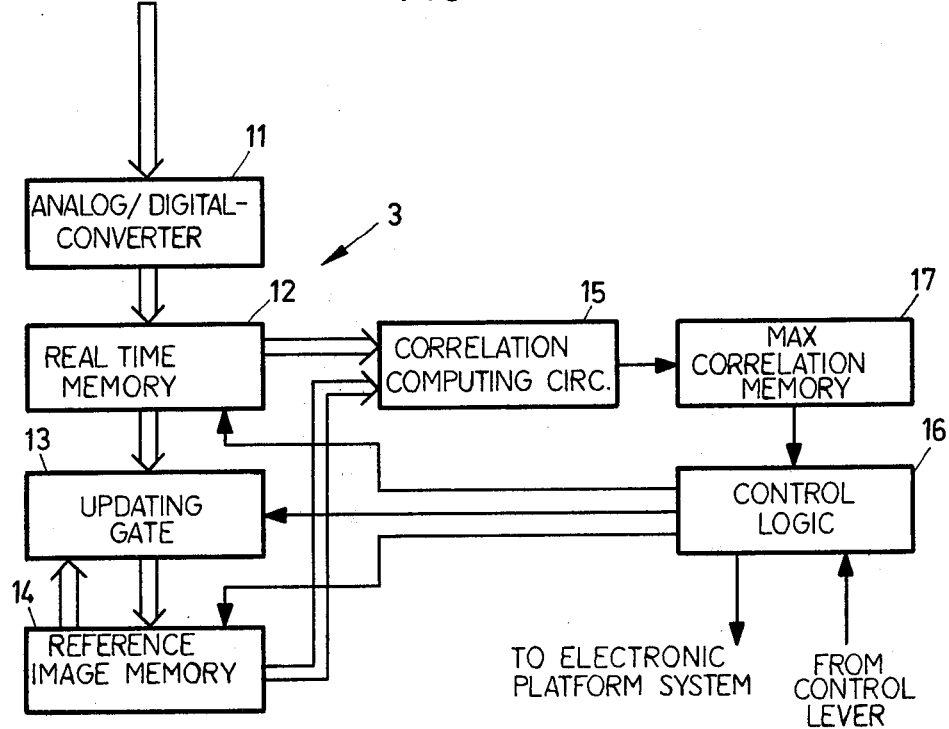
FIG. 2 is a block diagram showing the design of a video correlator and FIG. 3 is a block diagram showing how updating is effected according to the invention.

In FIG. 2 twin-line arrows illustrate a flow of image information. This flow of information reaches an analog/digital-converter 11 from an image sensor of the above described type which is not shown in the figure. The A/D-converter 11 is designed to convert an analog video signal from the image sensor, the amplitude of which corresponds to the contrast at each point within the field of view of the sensor, to a digital signal containing in binary coded form the same data as the video signal. A part of the digital signal, corresponding to the section of the field of view of the sensor that is within the window 6, is read, during each scanning cycle, into a memory 12, designated henceforth as the real time memory. The reason for the designation "real time memory" is that the information stored in the real time memory in real time corresponds to the image content in the scanned section. From the real time memory 12 the flow of image information passes, on the one hand, via an updating gate 13 to a memory 14, which is the above-mentioned reference image memory, and on the other hand to a correlation computing circuit 15 which also receives image information from the reference image memory 14 forming an output from the latter. In the same way the designation "reference image memory" points to the fact that this memory is to serve as a reference during the correlation process. The flow of image information is controlled by a control logic 15 in accordance with the result of the correlation circuit measurement as will be described below.

As previously stated the image sensor can be made to lock on to the object, by means of the control lever 7. When such lock-on is effected, the content of the real time memory 12 is copied, during one scanning cycle, into the reference image memory 14. In the course of each scanning cycle, i.e. with each image read into the real time memory 12, the contents of the two memories are compared in the correlation computing circuit 15, the said contents being placed in different positions relative to one another. The comparison may be effected in accordance with any known method of correlation by means of which a factor of merit is calculated for each relative position of the image information in the two memories 12, 14. The relative position in which the highest factor of merit, i.e. the maximum correlation, occurs, is stored in a memory 17. Depending on the relative position in which maximum correlation is achieved the control logic 16 controls the flow of image information, i.e. the correlation computing process and the updating of the reference image memory 14. The control logic 16 has also the object to regulate, in response to signals from the control lever 7, the arrangement of window 6 and to supply error signals to the electronic platform system 10.

Updating in accordance with the invention of the reference image memory 14 will now be explained with reference to FIG. 3 in which as before twin-line arrows illustrate the flow of image information.

Figure 3:
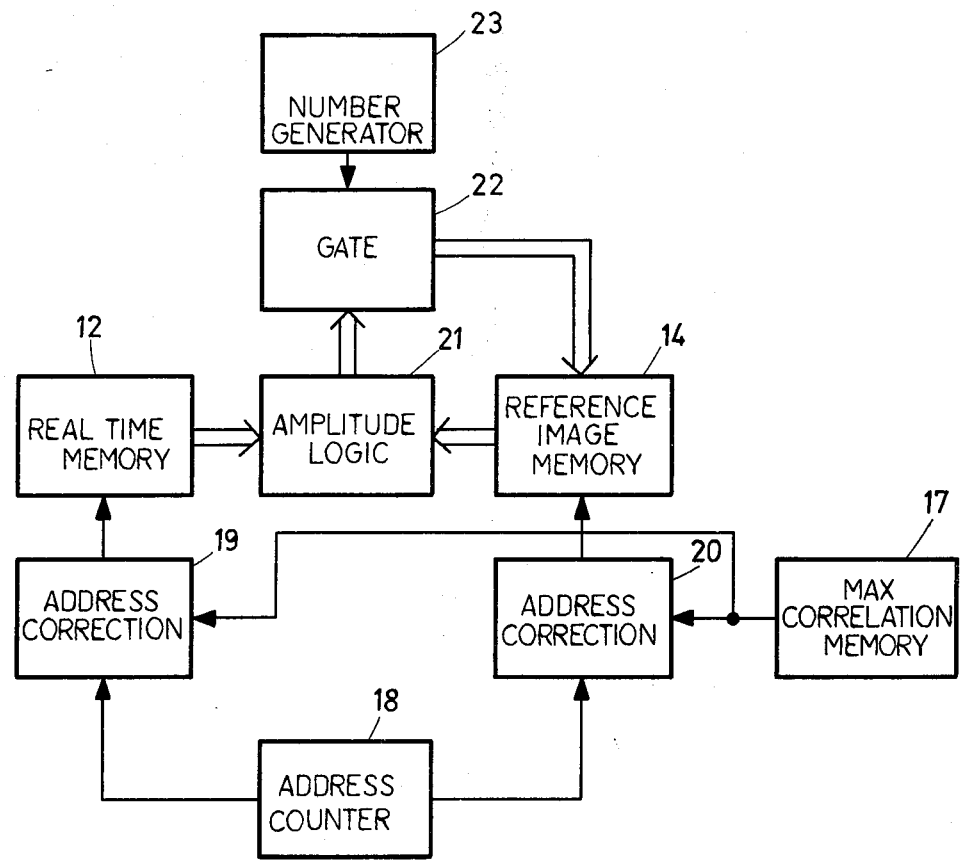

In FIG. 3 which shows especially how the real time memory 12 and the reference image memory 14 are addressed and the latter memory is updated, 18 designates an address counter by means of which partial elements in the memories 12, 14 are addressed sequentially via the address correction circuits 19 and 20, respectively, so that these are passed through line for line until all partial elements have been covered. The address correction circuits 19, 20 are controlled by memory 17 as regards the relative displacement between the contents of the memories at which the highest factor of merit is achieved as described above. The amplitude values in the partial elements addressed during this process in the respective memory are read into an amplitude logic 21 or a balancing circuit in which, according to a special characteristic of the invention, the amplitude values in corresponding positions are combined with one another, and a determination is made, according to a criterion applying to each combination of amplitude values, of the amplitude value with which the addressed position in the reference image memory 14 is to be updated. Such a criterion may be, for instance, that with quick or large changes in contrast, i.e. with large amplitude differences between the contents in the addressed partial elements, a mean value should be formed by means of which the partial element in the reference image memory is updated. This is equivalent to a certain filtration which prevents tracking of any image element which suddenly appears in the field of view. If the amplitude values in two corresponding positions are equal, updating will of course take place with this value, i.e. the content of the partial element in the reference image memory remains unchanged.

According to the primary characteristics of the invention, updating shall occur randomly or according to a predetermined rule of selection in such a manner that during each scanning cycle the memory is updated only partly and in positions that are distributed over the area of the memory. This is achieved by feeding the amplitude value, determined in accordance with the above criterion, to the addressed partial element in the reference image memory 14 via a gate 22 controlled by a number generator 23, which can generate either prime numbers or random numbers. With prime number generation the control operates in such a way as to ensure that the gate 22 is opened for each p-th of the partial elements addressed by the address counter 18, p being a prime number the size of which is selected with a view of the required updating rate. Should p be set to 1 this would mean that the entire reference image memory 14 would be updated during one single scanning cycle as described above. Therefore the prime number is at least equal to 3. With random number generation the gate 22 is opened once the address counter 17 has counted forward s partial elements, s being a random number, e.g. from a table of random numbers. Whenever the gate 22 is opened a new random number is supplied. In this case the updating rate varies owing to selection of different mean values for the table of random numbers.

With updating carried out according to the invention, and thus neither related to the result of the correlation nor carried out periodically, there is achieved a great probability that the reference image memory will not contain disturbing image elements and such as suddenly occur in the field of view of the sensor. This means that a correlation follower, wherein the updating of the reference image memory is carried out as described above is difficult to disturb, and therefore the tracking of an object can be carried out with high accuracy.

It is obvious that the invention can be modified in many ways within the scope of the inventive idea. It is possible, for instance, to utilize the video signals from a radar station for tracking an object. Further the updating may be carried out according to some other rule of selection than described above, e.g. according to a fixed pattern that is moved successively over the area of the memory.

We claim:

1. A video correlator for causing an object to be tracked by an image sensor that has a limited field of view and is arranged to cyclically scan said field of view and produce a video signal corresponding thereto, said video correlator comprising a first addressable memory and means for charging the same with digital-form information for each scanning cycle obtained from said video signal and corresponding to a section of said field of view, a second addressable memory and means for initially charging thereinto digital-form image information corresponding to the portion of said section that is to be kept centered in the field of view, means comprising correlation computing means for determining the portion of the information in the first memory that most nearly correlates with said image information and for producing an error signal which corresponds to shift in the location of said portion from cycle to cycle and which is employed for controlling alignment of said sensor with the object, and updating means for automatically updating image information in the second memory from information in the first memory, said video correlator being characterized by:

said updating means comprising address means arranged to address, during any one scanning cycle, discrete positions in said second memory that correspond to spaced apart parts of the image to which the information in said second memory corresponds, so that in any one scanning cycle said second memory is updated only partially and at positions that are distributed over the area of said image.

2. The video correlator of claim 1, further characterized by:
said address means of said updating means comprising
(1) address counter means for addressing, in succession during the course of a predetermined number of scanning cycles, all positions in said second memory and, for each such addressed position, the corresponding position in the first memory;
(2) balancing circuit means having an output terminal and having two input terminals which are respectively coupled to said first memory and to said second memory, and whereby the magnitude of the information in each addressed position in said second memory is compared with the magnitude of the information in the corresponding position in the first memory, said balancing circuit means being arranged
 (a) to issue an output substantially corresponding to a mean value of said magnitudes when said magnitudes differ by more than a predetermined amount and
 (b) to issue an output substantially corresponding to one of said magnitudes when said magnitudes differ by no more than said predetermined amount;
(3) an updating gate connected with said output terminal and through which outputs of said balancing circuit can be fed to said second memory; and
(4) a number generator connected with said updating gate and arranged to generate non-successive numbers whereby said updating gate is opened only when addressed positions in said second memory are those corresponding to the numbers generated by said number generator.

3. The video correlator of claim 1, further characterized by:
said address means of said updating means comprising
(1) an updating gate through which information is transferred from a position in the first memory to a correlative position in the second memory,
(2) an address counter arranged for addressing all positions in said second memory in succession during the course of a predetermined number of scanning cycles, and
(3) a number generator connected with said updating gate and arranged to generate non-successive numbers whereby said updating gate is opened only when addressed positions in said second memory are those corresponding to the numbers generated by said number generator.

4. The video correlator of claim 3, further characterized by:
said number generator being a prime number generator so that, of the addresses generated by said address counter during a succession thereof, said updating gate is opened only for every p-th address, where p is a prime number.

5. The video correlator of claim 3, further characterized by:
said number generator being a random number generator.

* * * * *